US008444924B2

(12) United States Patent
Burlica et al.

(10) Patent No.: US 8,444,924 B2
(45) Date of Patent: May 21, 2013

(54) GLIDING ARC ELECTRICAL DISCHARGE REACTORS WITH IMPROVED NOZZLE CONFIGURATION

(75) Inventors: Radu Burlica, Iasi (RO); Bruce Locke, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 294 days.

(21) Appl. No.: 12/477,386

(22) Filed: Jun. 3, 2009

(65) Prior Publication Data
US 2009/0236215 A1 Sep. 24, 2009

Related U.S. Application Data

(63) Continuation-in-part of application No. 11/749,945, filed on May 17, 2007, now Pat. No. 7,919,053.

(60) Provisional application No. 60/808,749, filed on May 26, 2006.

(51) Int. Cl.
*B01J 19/08* (2006.01)
(52) U.S. Cl.
USPC .................................................. 422/186.23
(58) Field of Classification Search
USPC ........................................ 422/186.21, 186.23
See application file for complete search history.

(56) References Cited

U.S. PATENT DOCUMENTS

| | | | | |
|---|---|---|---|---|
| 3,862,396 A * | 1/1975 | Machida et al. | ................ | 347/97 |
| 4,801,435 A | 1/1989 | Tylko | | |
| 6,007,742 A * | 12/1999 | Czernichowski et al. | .... | 252/372 |
| 6,238,629 B1 | 5/2001 | Barankova et al. | | |
| 6,524,538 B2 | 2/2003 | Barankova et al. | | |
| 6,734,964 B1 * | 5/2004 | Duan et al. | ..................... | 356/316 |
| 2006/0124445 A1 | 6/2006 | Labrecque et al. | | |

FOREIGN PATENT DOCUMENTS

FR 2639172 5/1990

OTHER PUBLICATIONS

Yan et al. (Plasma chemical degradation of phenol in solution by gas-liquid arc discharge, Plasma Sources Sci. Technol. 14 (2005) 637-644).*
Hajime et. al. ("Pluralization Technique of Gliding Arc Plasma", Applied Plasma Science, 12 (2004) 41-46).*
Burlica et al. "Formation of reactive species in gliding arc discharges with liquid water," Journal of Electrostatics, (2006), vol. 64, pp. 35-43.

(Continued)

Primary Examiner — Kishor Mayekar
(74) Attorney, Agent, or Firm — Novak Druce Connolly Bove + Quigg LLP

(57) ABSTRACT

A plasma gliding arc discharge reactor is described. The reactor may include a housing having a plurality of divergent electrodes, a power supply connected to the electrodes, which delivers pulsed power to the reactor, and a nozzle that directs a mixture of a carrier gas and a liquid to a region between the divergent electrodes, thereby generating plasma in the region. The nozzle can include a first inlet for receiving the carrier gas, a second inlet for receiving the liquid and a mixing chamber that is configured to mix the carrier gas and the liquid prior to being directed to the region.

11 Claims, 14 Drawing Sheets

OTHER PUBLICATIONS

Ching et al. "*Escherichia coli* Disinfection by Electrohydraulic Discharges," Environ. Sci. Technol., (2001), vol. 35, pp. 4139-4144.

Czernichowski "Gliding arc. Applications to engineering and environmental control," Pure & Appl. Chem., (1994), vol. 66, No. 6, pp. 1301-1310.

Czernichowski et al. "Zapping VOCs with a discontinuous electrical arc," CHEMTECH, (1996), vol. 26, No. 4, pp. 45-49.

Yan et al. "Plasma chemical degradation of phenol in solution by gas-liquid gliding arc discharge," Plasma Sources Sci. Technol., (2005), vol. 14, pp. 637-644.

Burlica et al., "Confined plasma gliding arc discharges," Int. J. Environ. & Waste Mgmnt, vol. 2, Nos. 4/5, 2008.

Burlica et al., "Pulsed Plasma Gliding-Arc Discharges with Water Spray", IEEE Transactions on Industry Applications, vol. 44, No. 2, Mar./Apr. 2008.

Porter et al., "Formation of Hydrogen Peroxide, Hydrogen, and Oxygen in Gliding Arc Electrical Discharge Reactors with Water Spray," IEEE Transactions on Industry Applications, vol. 45, No. 2, Mar./Apr. 2009.

Locke et al., "Analysis of Chemical Reactions in Gliding-Arc Reactors with Water Spray into Flowing Oxygen", IEEE Transactions on Plasma Science, vol. 37, No. 4, Apr. 2009.

Hajime Shiki, et al., Pluralization Technique of Gliding Arc Plasma, Journal of IAPS, vol. 12, (Dec. 2004), p. 41-46.

Hajime Shiki, et al., Electrode Erosion in Pulsed Arc for Generating Air Meso-Plasma Jet under Atmospheric Pressure, IEEJ Trans. FM, vol. 127, No. 10 (2007), p. 567-573.

Hajime Shiki, et al., Fundamental Properties of 4-in-1 Plasma ENergized-Jet at Atmospheric Pressure, Elsevier, vol. 83 (2008), p. 29-33.

\* cited by examiner

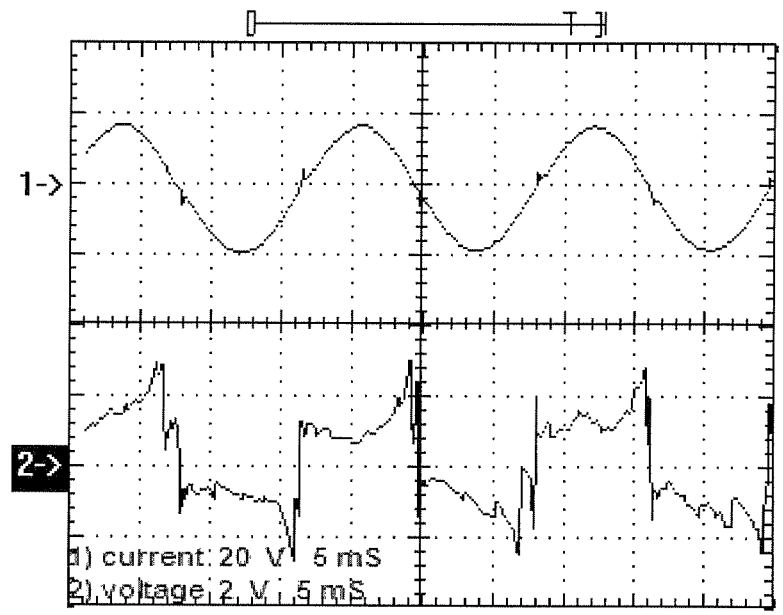
(a)
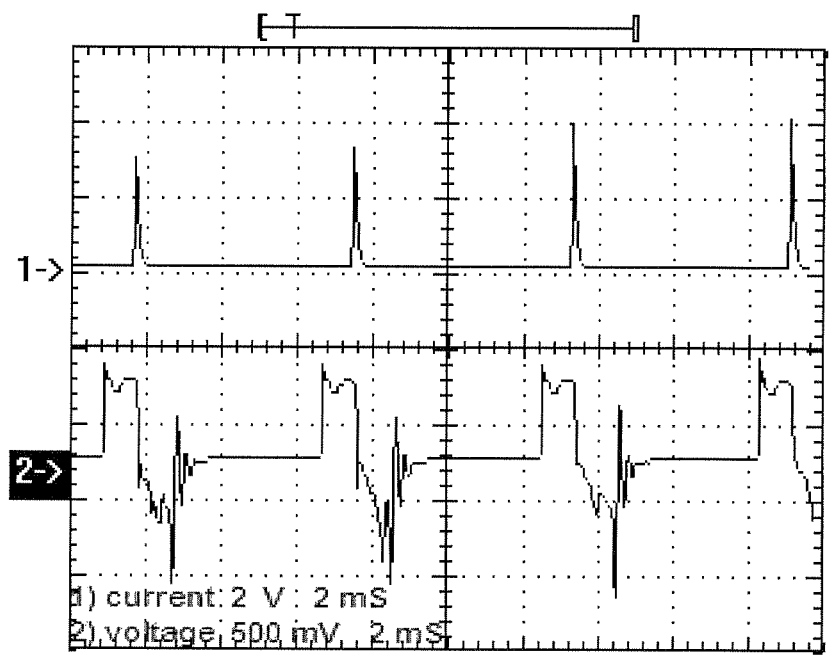
(b)
FIG. 3

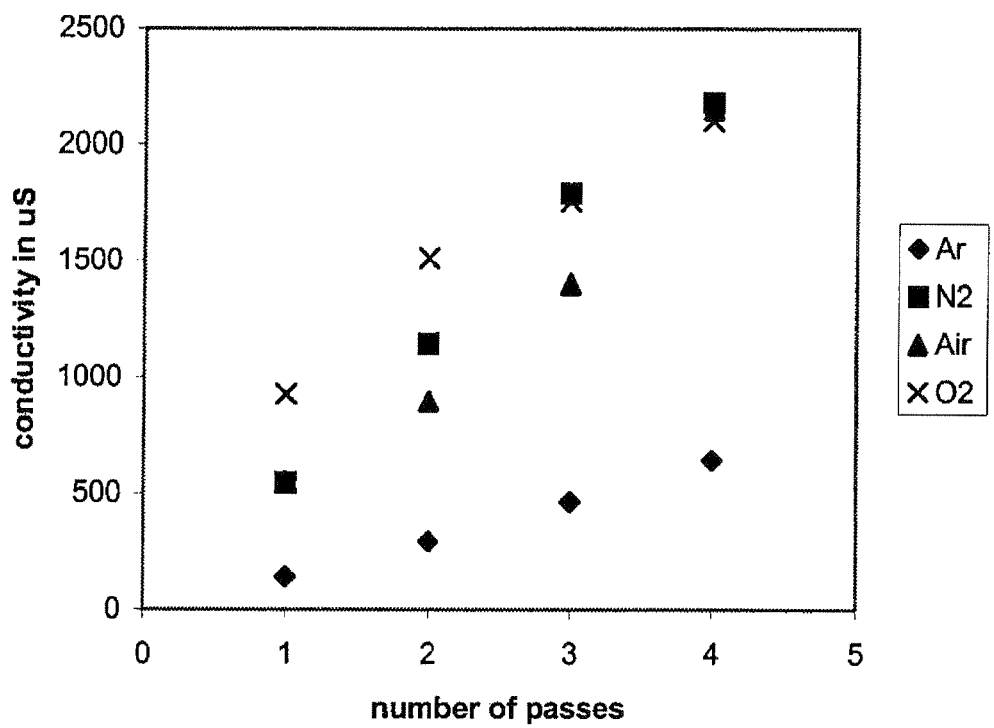
(a)
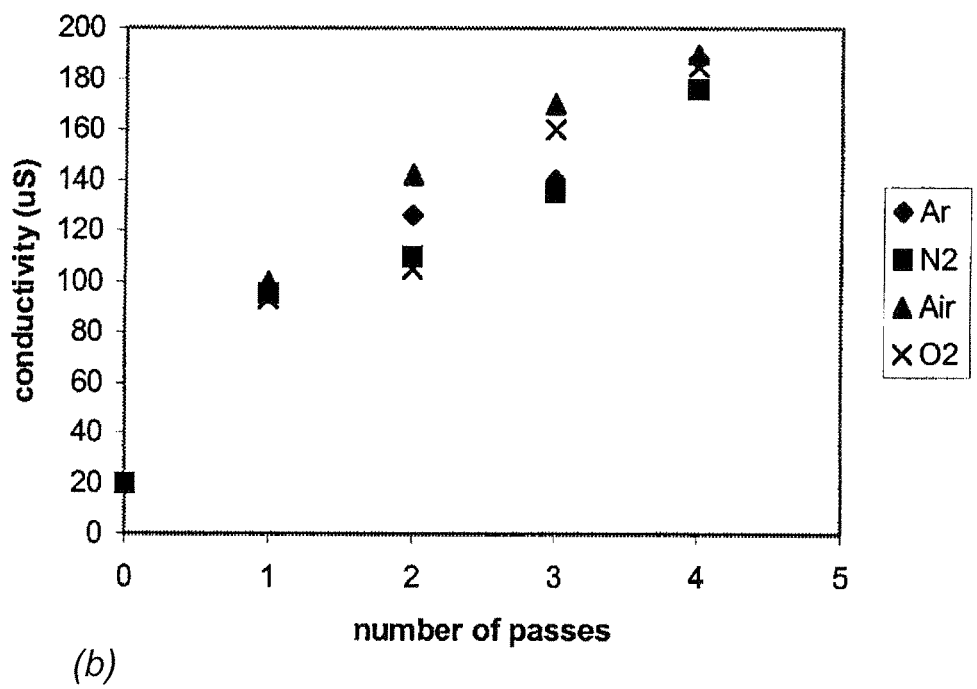
(b)
FIG. 4

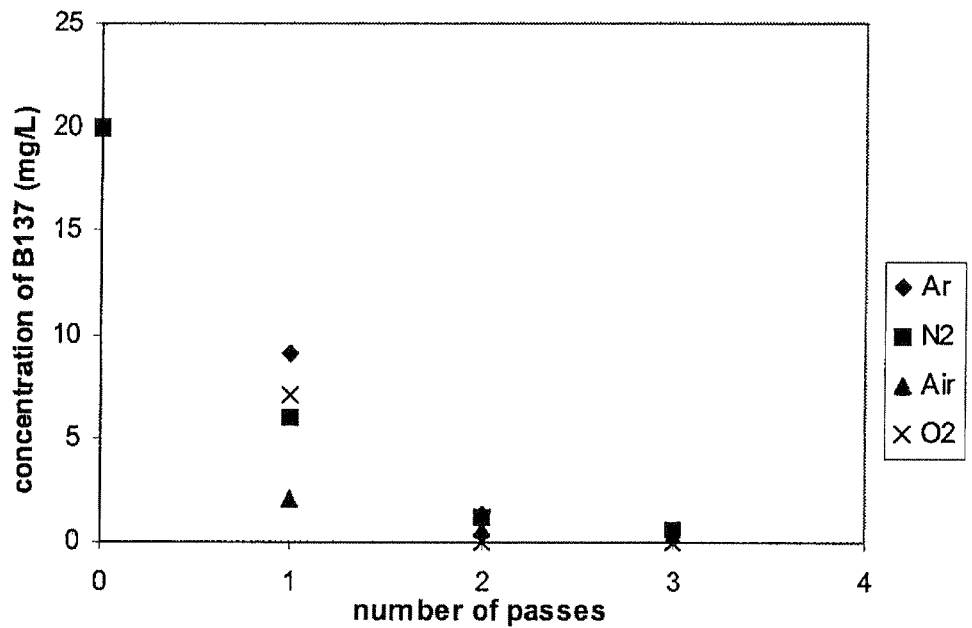
(a)
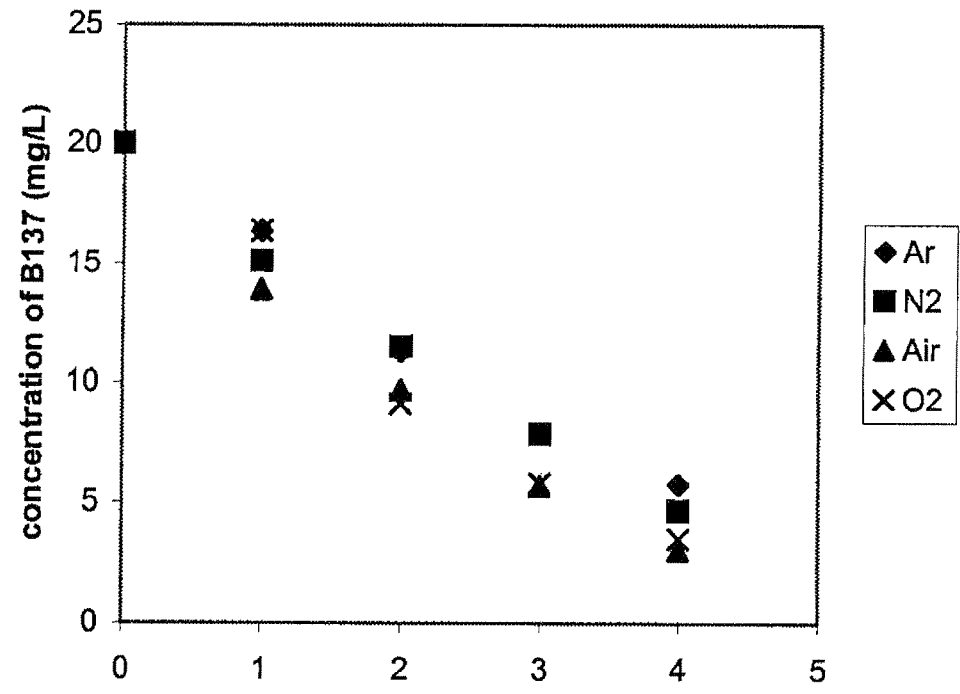
(b)
FIG. 7

GLIDING ARC ELECTRICAL DISCHARGE REACTORS WITH IMPROVED NOZZLE CONFIGURATION

CROSS-REFERENCE TO RELATED APPLICATIONS

The present application is a Continuation-in-Part of U.S. patent application Ser. No. 11/749,945, entitled "PULSED GLIDING ARC ELECTRICAL DISCHARGE REACTORS," filed May 17, 2007, which claims the priority of U.S. provisional patent application No. 60/808,749, entitled, "PULSED GLIDING ARC ELECTRICAL DISCHARGE REACTORS," filed on May 26, 2006. The foregoing applications are incorporated herein by reference in their entirety.

STATEMENT REGARDING FEDERALLY SPONSORED RESEARCH OR DEVELOPMENT

Not applicable.

FIELD OF THE INVENTION

A pulsed gliding arc electrical discharge reactor that is useful for chemical transformations in liquids and gases.

BACKGROUND OF THE INVENTION

In order to degrade organic pollutants in aqueous solutions a number of advanced oxidation methods such as direct Fenton's reactions, electrochemical methods, DC corona discharge, pulse corona discharge, photocatalysis, and UV photolysis have been applied. Gliding arc or glidarc technology has been demonstrated to be effective at removing organic compounds from aqueous solutions and gases. A gliding arc is an electrical discharge formed between two or more thin "knife-edge" divergent electrodes with a high velocity (for example, >1 m/s) gas flowing between the electrodes to prevent sparking. The electrical discharge is formed in the gas phase between two or three divergent electrodes at the smallest gap between the electrodes and the discharge spreads as it glides along diverging electrode edges with an increasingly larger gap until it dissipates as it clears the electrodes. The gas flow maintains a near non-thermal characteristic of the plasma. This discharge leads to the formation of positive ions, negative ions, electrons and other chemically active species. Usually one or two high voltage AC transformers energize the gliding arc reactors (ACG). Although, nearly all previous work with the gliding arc discharge has used AC power, in early studies DC voltage was examined using a high voltage, 3000V, obtained by rectifying a secondary voltage of a transformer at 50 Hz. The usual AC power supply uses the alternating voltage of the high voltage transformer's secondary, which makes it more reliable and robust then the DC power supply that uses high voltage diodes to rectify the voltage. Both configurations have significant energy losses by thermal effect.

Gliding arc discharges have been investigated as a potential technology for gas phase pollution treatment and for liquid phase pollution treatment. While fundamental studies of gas phase gliding arc discharges have been conducted, a detailed understanding of how to apply gliding arc technology for water treatment is still evolving. One mode of operation is to apply the gliding arc above a liquid solution, generally water, whereby the high-velocity gas and some regions of the plasma impinge upon the liquid surface causing reactive species formed in the gas phase to transfer into the liquid and to possibly form reactive species in the liquid or liquid-gas interface. Measurements of OH radicals and NO formed in humid air gliding discharges and the analysis of the pH changes induced in the liquid phase below the discharge from nitrates formed in humid air plasma have been conducted.

An alternative electrode configuration has been examined where the liquid is sprayed through the plasma zone. Since the efficiency of aqueous solution treatment by gliding arcs depends in part on the gas-liquid interfacial contact area between the solution treated and the plasma zone, spraying the solution via a special two-way nozzle directly into the plasma is an effective method to enhance liquid phase treatment using a gliding arc. This alternate configuration has been shown to enhance dye decolorization more effectively than using a reactor configuration with the discharge over a planar water surface. Also in contrast to the discharge above water, when water is sprayed through the discharge with oxygen as the carrier gas, significant amounts of hydrogen peroxide have been formed.

Many other technologies exist for the production of hydrogen peroxide. For example, hydrogen peroxide is made industrially in very large-scale chemical processes that require large quantities of chemical feedstocks. However, there are many applications where small-scale systems and where generation using only readily available materials (water, oxygen, electricity) are of interest. Other competing technologies for the small-scale generation include electrochemical processes. Those electrochemical processes require more complicated membrane and electrode systems than does gliding arc technology. The gliding arc reactor can produce the hydrogen peroxide directly in the spray and it uses only water, oxygen, and electricity. In fact, the use of oxygen is optional, as hydrogen peroxide can be formed with a noble gas, water and electricity in such discharges, although greater amounts can be formed in the case with oxygen as a carrier gas. Gliding arc technology permits the use of small reactors and power supplies that are portable and easy to construct.

Ultimately, the practical use of gliding arc technology to promote chemical transformations, such as the removal of organic pollutants in water or the generation of hydrogen peroxide, other reactive oxygen species, or reactive nitrogen species for treatment of potentially contaminated foods, depends on the efficiency that can be achieved. The efficiency can be measured as the specific energy yield of the chemical conversion of interest.

SUMMARY OF THE INVENTION

The subject matter herein is directed to a pulsed plasma gliding arc discharge reactor that has a housing with at least one inlet to direct a gas or a gas and liquid mixture, a gas comprising fluid, to a plasma region that is generated at the discharge between two or more divergent electrodes supported by the housing where the electrodes are connected to a pulsed power supply and an outlet from the housing. The pulsed power supplied to the electrode can be from an inductive coil, such as an ignition coil, where the coil is driven from a power supply. The reactor housing is preferably electrically non-conductive. The gas-liquid inlet can be a two-way nozzle which can be a plain orifice pressure atomizer, a pressure swirl pressure atomizer, a gas assist gas liquid atomizer, or gas blast gas liquid atomizer so that a sufficient velocity of the gas-liquid mixture can maintain the plasma. The term "plasma" is defined as a partially ionized gas in which a certain proportion of electrons are free rather than being bound to an atom or molecule. Additionally, a "plasma region" is defined as any area in which plasma is generated or has the potential to be generated. A "plasma gliding arc discharge reactor" is defined as a structure that includes two or more divergent electrodes coupled to a power supply in which gases flow through the electrodes, thereby forming positive ions, negative ions, electrons or other chemically active species.

The subject matter is also directed to a method for the chemical transforming of at least one component of a gas or gas and liquid mixture by spraying the gas or the gas and liquid mixture into a plasma generated in a pulsed gliding arc discharge. The discharge can be formed between divergent electrodes connected to an inductive coil driven by a pulsed power supply. The chemical transformation can be the generation of hydrogen peroxide or hydrogen from water. The chemical transformation can be the degradation of an organic or inorganic pollutant in water.

Another plasma gliding arc discharge reactor is described herein in which the reactor includes a housing having a plurality of divergent electrodes supported by the housing, a power supply connected to the electrodes and a nozzle that is coupled to the housing. The nozzle may direct a mixture of a carrier gas and a liquid to a region between the divergent electrodes, which can lead to the generation of plasma in the region. The nozzle may include a first inlet for receiving the carrier gas, a second inlet for receiving the liquid and a mixing chamber that may be coupled to both the first inlet and the second inlet. In one arrangement, the mixing chamber can be configured to mix the carrier gas and the liquid prior to being directed to the plasma region. The nozzle may also include an outlet that can be coupled to the mixing chamber and that can direct the mixture of the carrier gas and the liquid to the plasma region.

In one embodiment, after exiting the mixing chamber, the mixture of the carrier gas and the liquid may be an aerosolized spray in which the liquid is formed into small droplets. As an example, liquid droplets or aerosol particles may range from less than one micrometer to five-hundred micrometers in diameter. The liquid can be water or a combination of water and methanol or some other organic liquid. Moreover, a flow rate of the liquid may be selected from a plurality of flow rates. As another example, the carrier gas may be one of air, argon, oxygen or nitrogen or any combination of air, argon, oxygen or nitrogen. Similar to the liquid, the flow rate of the carrier gas may be selected from a plurality of flow rates.

In another embodiment, the reactor may also include a pulsed pump that can inject the liquid into the mixing chamber through a recurrence of discrete strokes. Optionally, the reactor may have a confined configuration, and the power supply can be a pulsed power supply. As another example, reaction products are generated in the reactor, and the reaction products may include hydrogen peroxide, hydrogen or nitrates.

A method of generating reaction products in a gliding arc discharge reactor having a plurality of divergent electrodes is also described herein. The method may include the steps of receiving a power supply at the divergent electrodes, injecting a liquid into a mixing chamber and injecting a carrier gas in the mixing chamber. The injection of the liquid and the carrier gas may result in an aerosolized mixture of the liquid and the carrier gas. The method can also include the step of—once the aerosolized mixture is created—injecting the aerosolized mixture in a plasma region between two divergent electrodes.

As an example, the liquid described in the method may be water or a combination of water and methanol. Injecting a combination of water and methanol into the mixing chamber may result in increased production of hydrogen when compared to injecting water into the mixing chamber. The method may also include the step of varying a flow rate of the liquid from a first flow rate to a second flow rate. Also, the carrier gas may be one of air, argon, oxygen or nitrogen or a combination of any of air, argon, oxygen or nitrogen. The carrier gas may have a first flow rate, and the method may further include the step of adjusting the first flow rate of the carrier gas to a second flow rate.

In another arrangement of the method, injecting the liquid into the mixing chamber may include injecting the liquid in a pulsed manner. In addition, the reaction products of the method may include hydrogen peroxide, hydrogen or nitrates, and the power supply can be a pulsed power supply.

A method of generating hydrogen in a gliding arc discharge reactor having a plurality of divergent electrodes is also described herein. This method can include the steps of receiving a power supply at the divergent electrodes, injecting a gas carrier into a mixing chamber and injecting a liquid into the mixing chamber in which the liquid can be a combination of methanol and water. The injection of the combination of the methanol and the water along with the carrier gas in the mixing chamber may cause the water and methanol combination to form aerosolized droplets of water and methanol in the carrier gas. The method can also include the step of outputting the mixture of water and methanol droplets and carrier gas in a plasma region between the divergent electrodes to produce hydrogen.

In one arrangement of this method, carrier gas can be one of air, argon or nitrogen or any combination of air, argon or nitrogen. Also, receiving the power supply can further include receiving a pulsed power supply at the divergent electrodes. As an option, the method can include the step of injecting the combination of water and methanol into the mixing chamber in a pulsed manner.

BRIEF DESCRIPTION OF THE DRAWINGS

FIG. 3 shows plots of the current and voltage wave forms for (a) the ACG reactor and (b) the pulsed gliding arc discharge (PGD) reactor used in the Examples.

FIG. 4 shows plots of the evolution of the conductivity of water passed through: (a) the ACG reactor and (b) the PGD reactor using various working gases for consecutive passes through the reactor.

FIG. 7 shows plots of the decrease in the concentration of a blue dye in aqueous solution using: (a) the ACG reactor and (b) the PGD reactor using various working gases for consecutive passes through the reactor.

DETAILED DESCRIPTION

Figure 1:
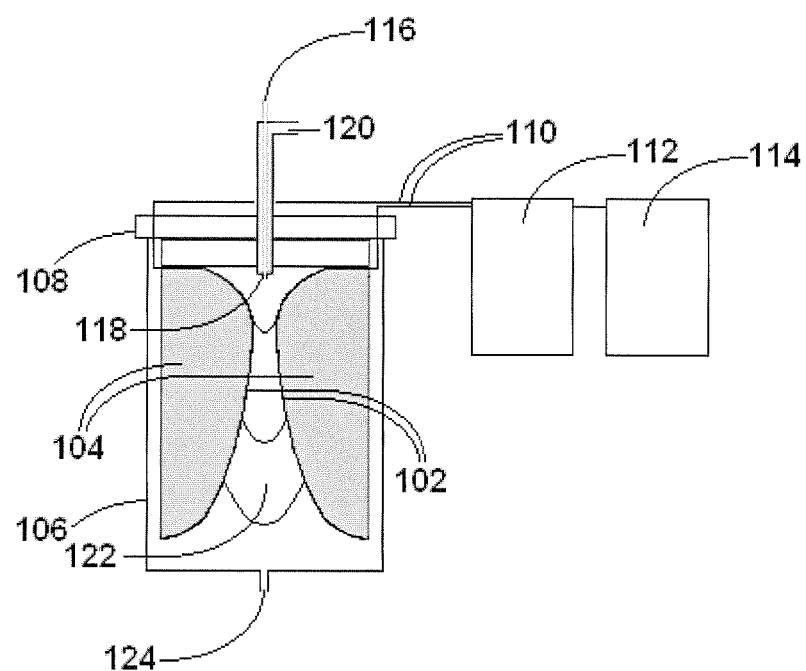
FIG. 1 shows an exemplary gliding arc reactor configuration as used in the experiments for determining the profile and efficiency of the present invention.

During the study of gliding arc technology it was discovered that a dramatic increase in the efficiency was possible by changing the mode of the electrical discharge. Surprisingly, it was discovered that by using a pulsed power supply to produce a gliding arc discharge plasma (PGD), the energy yield for the destruction of an organic blue dye in the PGD reactor was approximately 150 times higher than in the ACG reactor with Ar carrier and the energy yields for the formation of hydrogen peroxide are 270 and 260 times higher in the PGD than the ACG with Ar and $O_2$ carrier gases, respectively. The energy injected into the discharge by the pulsed power supply is also much less than those of early studies of DC gliding arc where the discharge was continuously supplied by the DC voltage.

Gliding arc efficiency can be significantly improved, as indicated by an increase of the specific energy yield of the treatment by providing a pulsed plasma gliding arc in a reactor between two divergent electrodes (PGD). For example, a reactor configuration including an ignition coil driven by a pulsed power supply, instead of the AC high voltage transformer of a traditional glide arc reactor (ACG), leads to significantly higher efficiency in performing chemical transformations. As illustrated in the exemplary FIG. 1, two stainless steel wire divergent electrodes 102 attached to two ceramic insulators 104 of the same shape can be fixed in a reactor body comprising a vessel 106 with a cap 108, which can be constructed of glass or other structural material inert to the chemical species introduced to or formed in the reactor. Other electrode materials and configurations can also be used. For example, in place of the wire attached to the edge of the ceramic insulator as shown here, a solid metal electrode of similar shape as the insulator can be used. Rectangular and cylindrical glass vessels have been used as reactor bodies. The electrodes 102 are connected via wires 110 to an induction coil 112, which can be an automobile ignition coil, driven by a power supply 114 with a pulse generator. The form and appearance of the electrical discharge and the electrochemical reaction can be varied by a changing the electrical discharge parameters such as applied voltage, frequency and power.

Water, a water solution, or another liquid can be introduced to the reactor of exemplary FIG. 1 via a liquid inlet 116 as a spray or a mist via a nozzle 118 with the aid of a working gas provided through a gas inlet 120 into the plasma zone 122 of the glide arc reactor where the gas comprising fluid is subjected to an intense electronic and ionic bombardment. The nature of the working gas can affect the type and quantities of species formed during exposure of the liquid to the discharge in the gliding arc reactor and collected or distributed after exit of the reactor outlet 124. Properties displayed by the glide arc processed water, water solution, or other liquid are affected by the working gas used include pH, conductivity, and the proportions of species such as hydrogen peroxide and nitrogen oxides. The liquid can be passed through the glide arc reactor a single time or multiple passes can be carried out. The quantities of the various species displayed in the treated liquid generally increase with the number of passes through the glide arc reactor, although with a sufficient number of passes, the amount produced may level off. Multiple reactors can be aligned in series, parallel, or a combination of series and parallel to carry out the desired chemical transformations more rapidly. The working gas can be a noble gas such as argon, or other gas including air, nitrogen, and oxygen, although many other gases and gas mixtures can be used and can be matched to the chemical transformations to be carried out using the gliding arc reactor.

The actual configuration of the pulsed plasma gliding arc reactor can vary in numerous independent manners retaining the critical feature of the pulsed power supply used, such as an ignition coil driven by a pulse generator. The number, shape, and size of the electrodes, housing, inlets, and outlets can all be varied independently or in combination to optimize the efficiency or throughput of the reactor. The gas and liquid flow rates can be varied to optimize the desired efficiency or throughput. The working variation used can be at less than optimal parameters for efficiency or throughput if other factors, such as safety of a specific process, dictate less than optimal conditions. Throughput and efficiency can also be affected by the use of multiple reactors with the reactors combined in series, parallel, or a combination of series and parallel such that high efficiency and high throughput can be achieved.

Figure 2:
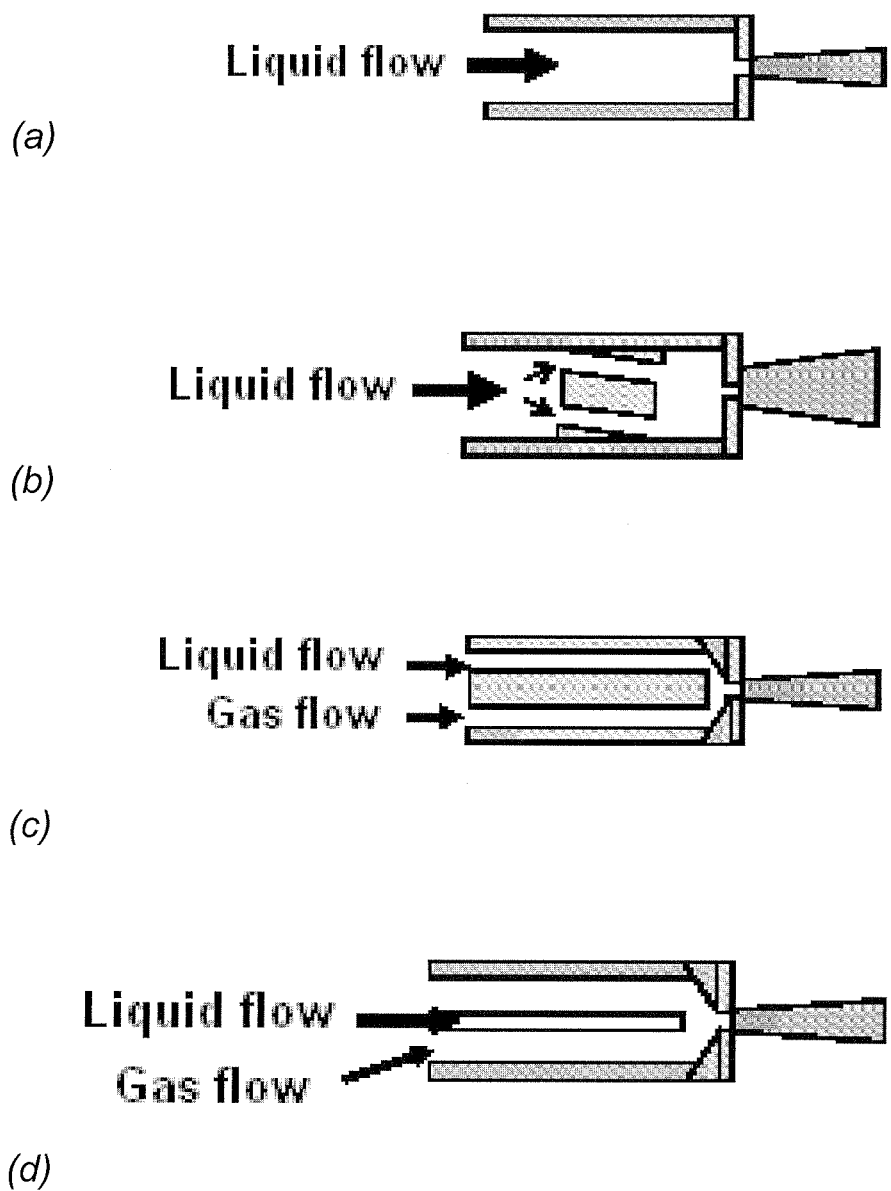
FIG. 2 shows the basic design of four nozzles that can be employed in the practice of the invention: (a) plain orifice pressure atomizer; (b) pressure swirl pressure atomizer; (c) gas assist gas liquid atomizer; and (d) gas blast gas liquid atomizer.

One important component of the reactor is the liquid inlet which is preferably a nozzle. The nozzle can inject a non-pressurized liquid stream into a high velocity but ambient pressure gas stream, as is the type used in the examples that follow below where a peristaltic pump was used to inject the liquid. A nozzle system can be used to achieve a liquid-droplet gas stream velocity of about 60 m/s or more which permits the achievement of a stable gliding arc discharge. Other nozzle systems that can be used to achieve acceptable liquid particle streams are pressure atomizers and gas-liquid atomizers, illustrated in FIG. 2.

A simple pressure atomizer, a plain orifice atomizer, as shown in FIG. 2(a) can form drops of about 200 to about 500 μm at velocities of about 25 to about 45 m/s at low pressure and at velocity in excess of 100 m/s, at high pressures of about 5 MPa. A constriction in the injection tube coupled with a pump to pressurize the liquid can be used to produce a narrow conical region containing the spray with a relatively coarse particle size distribution. A second pressure atomizer that can be used in the invention is a pressure swirl atomizer, shown in FIG. 2(b). Again only liquid injection occurs but the internal geometry of the nozzle provides for a finer particle distribution in the spray. These pressure atomizers are highly reliable, producing highly uniform sprays where a range of droplet sizes and velocities can be realized by control of the pressure. Both pressure atomizers can provide a high velocity stream (>100 m/s) of atomized liquid vapor droplets that can sufficiently stabilize the plasma discharge (i.e. prevent sparking) and enhance reactive species formation.

The second general type of atomizer that can be used in the present invention include gas assist and gas blast atomizers, shown in FIGS. 2(c) and 2(d), respectively. These atomizers use the kinetic energy of a flowing gas to break up the liquid stream into droplets. The gas assist atomizer keeps the amount of gas used to a minimum and the gas blast atomizer uses larger amounts of gas. These gas-liquid atomizers provide fine particle size droplets. Although gas blast atomizers are limited to velocities of about 120 m/s, gas assist atomizers can exceed this value.

The distance from the nozzle to the plasma zone can be optimized for a given nozzle such that the distance from the nozzle to the plasma zone is large enough for sufficient atomization but short enough to achieve a sufficiently high density of the spray in the plasma. The proper distance can be determined empirically or calculated for any given nozzle, liquid viscosity, and pressures of the liquid and gasses.

The efficiency of any given gliding arc reactor can be evaluated by the calculation of the specific energy yield for a given chemical transformation. One goal of the present invention is to efficiently produce hydrogen peroxide, $H_2O_2$ from water, and the specific energy yield for this transformation is given by equation (1):

$$G = 60[H_2O_2]V_0 M_{H2O2} Q_w / 1000 n P V_0 \quad (1)$$

where:
G is the specific energy yield in g/kWh
$[H_2O_2]$ is the hydrogen peroxide concentration in mM
$M_{H2O2}$ is the molecular mass of hydrogen peroxide in g/M
$Q_w$ is the water flow rate in mL/min
P is the power discharge in W
$V_0$ is the volume of the water treated in the reactor in L. In the example below $V_0 = 0.2$ L
n is the number of passes of the water through the reactor Hence, the ability of the present invention to improve significantly the efficiency of a glide arc reactor by using a pulsed plasma gliding arc can be evaluated by the increase of the specific energy yield for the chemical transformation such as that given above for the production of hydrogen peroxide.

EXAMPLES

The present invention is further illustrated by the following specific Examples, which should not be construed as limiting the scope or content of the invention in any way.

The pulsed plasma gliding arc reactor between two divergent electrodes (PGD) and its improved performance over the common AC high voltage glide arc reactor (ACG) is illustrated by the following non-limiting examples. For all examples the ACG and PGD reactors were constructed as described below. Other sizes, shapes, power sources and configurations can be used and will be obvious to those of ordinary skill in the art.

Glide arc reactors were constructed with the configuration of FIG. 1, where the reactor body was prepared using a glass cylindrical vessel of a diameter of 50 mm and a height of 70 mm, into which were placed two 1 mm diameter stainless steel wire divergent electrodes, each electrode being attached to two ceramic insulators. In one reactor (ACG) the electrodes were connected to an AC high voltage transformer with a magnetic shunt (P=700 W, $U_0$=12 kV, 60 Hz). The average electrical power of the ACG discharge calculated for 4 points was found to be approximately 150 W, with a measurement error of approximately 10%. The average power was used for determinations of the efficiency of the reactor. The wave form of the current and voltage are shown in FIG. 3(a).

In a second reactor (PGD) the electrodes were connected to a pulse power supply (18 W average power in the primary of the ignition coil, 25 kV free of charge, 160 up to 250 Hz with best results obtained in the experiment at 170 Hz), which is an automobile ignition coil, driven by a pulse generator. The average electrical power of the discharge, measured at the electrodes, calculated for 5 pulses was found to be approximately 250 mW, with a measurement error about 15%. The average power was used for efficiency determinations. The wave form of the current and voltage are shown in FIG. 3(b).

Water was passed separately through the ACG reactor and the PGD reactor. The water displayed an initial pH of 5 and a conductivity of 10 µS/cm. The working gas was varied using individually air, nitrogen, oxygen and argon for each reactor. A quantity of 200 mL of water was used for each reactor and multiple passes were made for each 200 mL quantity through each reactor. Measurements of the solution parameters were carried out on the water after each pass.

For both reactors the evolution of the pH was similar. Using the ACG reactor the pH decreased from the initial value of 5 to a value of approximately 2.5 after four passes. Using the PGD reactor, the pH decreased from the initial value of 5 to a value of approximately 3 after four passes. The change in pH did not differ in a significant manner using different working gases.

The change in conductivity is shown in FIG. 4. The change in conductivity differed significantly with the two reactors. In the case of the ACG reactor, shown in FIG. 4(a), the conductivity change for the initial and subsequent passes depended on the working gas and the observed rate of change was much lower for the inert gas argon. The conductivity of the water using argon increased from the initial value of 10 to approximately 120 µS/cm after one pass and ultimately achieved a conductivity of approximately 550 µS/cm after four passes. In contrast, the conductivities of the water using nitrogen, air or oxygen increased much more rapidly with a one pass value in excess of 550 µS/cm and a value after four passes of approximately 2100 µS/cm. This conductivity change suggests that the ionized or excited gas species impacting with the water molecules play an important role in the nature and quantity of species formed in water using the ACG reactor; much of the conductivity increase is likely due to the formation of nitrates from nitrogen oxides formed in the discharge.

In the case of the PGD reactor, shown in FIG. 4(b), the conductivity change was much less and was essentially independent of the working gas. As can be seen in FIG. 4(b), the conductivity is approximately 100 µS/cm after a single pass regardless of the working gas and achieves a conductivity of less than 200 µS/cm after four passes through the PGD reactor. This suggests that in the lower energy PGD, the much lower amounts of nitrogen oxides lead to a smaller increase in conductivity, although not all of the conductivity increase may be due to nitrates only.

Figure 5:
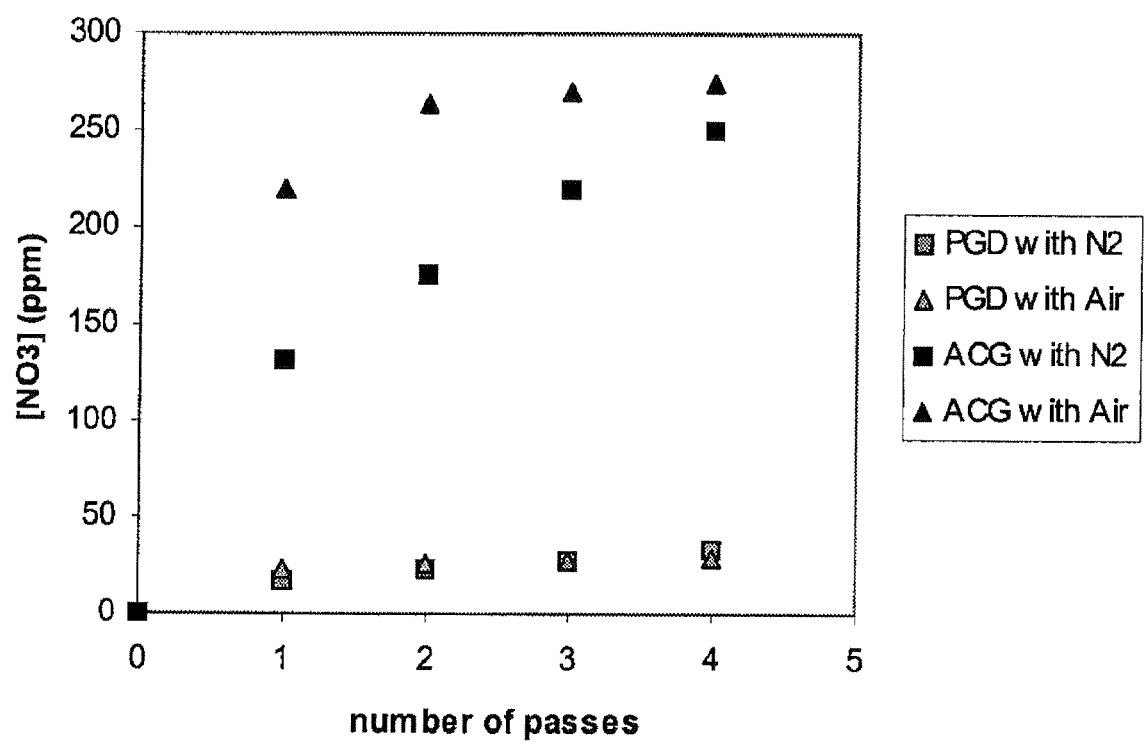
FIG. 5 shows a plot of the generation of nitrate ($NO_3^-$) in water using the ACG reactor and PGD reactor with nitrogen and air as the working gases for consecutive passes through the reactor.

This difference in the mode of ionization is also indicated by the difference in the generation of nitrates using the ACG and PGD reactors when the working gas is nitrogen or air. As can be seen in FIG. 5 very low quantities of nitrates are formed using the PGD reactor relative to the significantly higher quantities formed when the ACG reactor was used. This indicates the additional advantage of using a PGD reactor over an ACG reactor where nitrogen oxide species are preferentially avoided or minimized while using air as the working gas. The gas supplied and other conditions employed with the reactor can be varied to promote the formation of reactive nitrogen species when such species are desired for a particular sterilization application.

Figure 6:
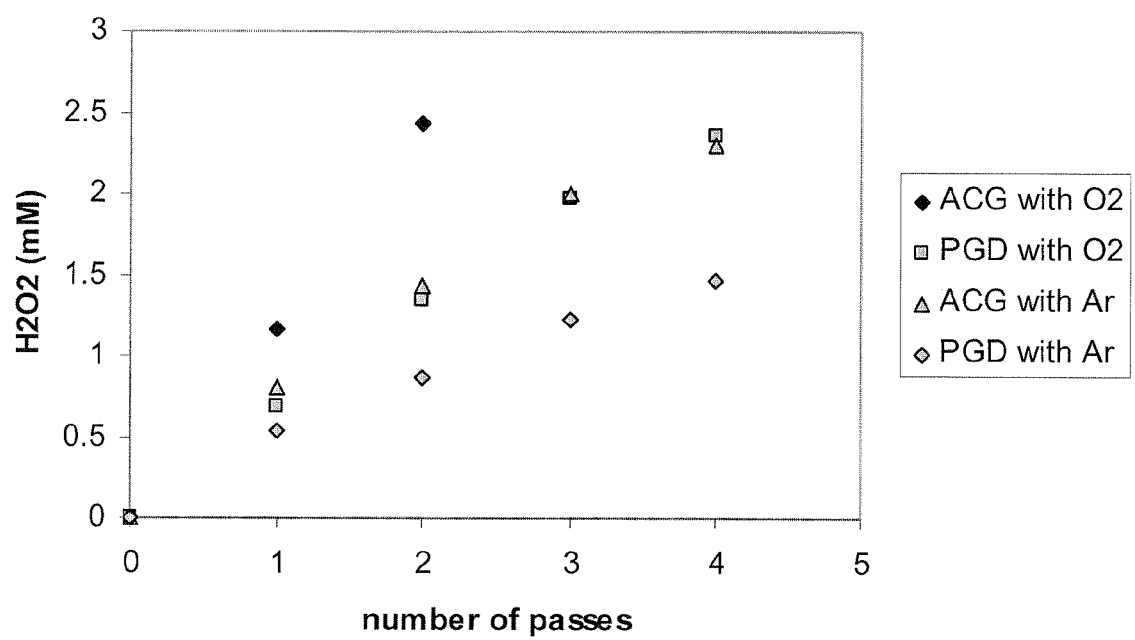
FIG. 6 shows a plot showing the generation of hydrogen peroxide in water using the ACG reactor and PGD reactor with argon and oxygen as the working gases for consecutive passes through the reactor.

The formation of hydrogen peroxide for the ACG and PGD reactors is shown in FIG. 6 for oxygen and argon. As can be seen in FIG. 6, the formation of hydrogen peroxide was similar for the ACG reactor with argon and the PGD reactor with oxygen, was higher with the ACG reactor with oxygen, and lower with the PGD reactor with argon. The specific energy for the production of hydrogen peroxide after two passes is given in Table 1. As can be seen from Table 1, the specific energy is more than 270 times greater (37.5/0.13) for the PGD reactor than for the ACG reactor using argon as the working gas and more than 160 times (54.5/0.21) greater for the PGD reactor using oxygen.

TABLE 1

Specific Energy for Hydrogen Peroxide Production in g/kWh

| | Specific Energy (g/kWh) Working Gas | |
| --- | --- | --- |
| | Argon | Oxygen |
| ACG reactor | 0.13 | 0.21 |
| PGD reactor | 37.5 | 54.5 |

Example 2

The treatment of aqueous solutions of the pentasodium salt of the dye blue 137,

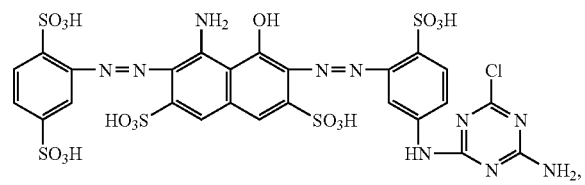

was examined, separately using the ACG reactor and the PGD reactor. The working gas was varied using individually air, nitrogen, oxygen and argon for each reactor. A quantity of 200 mL of a 20 mg/L aqueous blue dye solution was passed multiple times through each reactor. Absorbance measurements of the dye were performed by UV spectroscopy using a Perkin-Elmer/Lambda 3A spectrometer after each pass and the measured absorbance was used to calculate a concentration by mass of the dye. The results of the blue dye degradation are presented in FIG. 7(a) for the ACG reactor and in FIG. 7(b) for the PGD reactor. As can be seen in FIG. 7(a), the degradation of the dye with the first pass was rapid, with at least fifty percent degradation on the first pass for all working gases, but highly dependent on the working gas composition. The degradation was most rapid in air and least rapid in argon. By the second pass, little dye (color) remained regardless of the working gas used, and almost no dye (color) remained after a third pass for any working gas. After four passes, the dye concentration was 1 mg/L or less. In contrast, the PGD reactor, as shown in FIG. 7(b) showed no significant dependence on the composition of the working gas. The concentration of dye after four passes was 5.5 mg/L using argon and 3 mg/L using air.

A second goal of the present invention is to efficiently degrade organic pollutants and was modeled by the destruction of the blue dye. The specific energy yield for this transformation is given by equation (2):

$$G=60\Delta[B137]V_0 Q_w/1000nPV_0 \qquad (2)$$

where:
G, $Q_w$, P, $V_0$, and k are define as in equation (1), and A[B137] is defined by the change in the concentration of the blue dye in mg/L after treatment.

Table 2 below, gives the calculated values for the specific energy for degradation of the dye that was examined by the two-electrode PGD and ACG reactors used in Examples 2, and for comparison, the value for degradation using a corona discharge (disclosed in R. Burlica et al., "Organic Dye Removal from Aqueous Solution by Glidarc Discharges", *J. Electrostatics* 62 (4), 2004, pp. 309-321 and incorporated by reference) is included in Table 2. As can be seen in Table 2, the degradation ability improves by more than two orders of magnitude over that of a two-electrode ACG reactor (5/0.035), and over two times that of a pulsed corona discharge (5/2).

TABLE 2

Specific Energy for Dye Degradation in g/kWh

| | Reactor | | |
| --- | --- | --- | --- |
| | ACG | Pulsed Corona | PGD |
| G (g/kWh) | 0.035 | 2 | 5 |

Hence, it has been discovered and demonstrated that a glide arc reactor using a pulsed discharge greatly enhances the efficiency of generating hydrogen peroxide or degrading organic impurities. Other chemical transformations that may be performed using the pulsed gliding arc reactor described above include: hydrogen generation from water, other liquids, including ethanol, and gases; natural gas reformation; gas stream cleaning processes, whereby compounds such as nitrogen oxides, sulfur oxides, carbon oxides, hydrogen disulfide, chlorine, volatile organic compounds or ammonia removal via reactions with liquids or aqueous-based solutions; destruction, inactivation, or sterilization of biological species such as bacteria, viruses, and other organisms on surfaces, in the liquid phase, or in the gas phase; surface treatment using the products of the plasma discharge from various gas-liquid systems or any reaction where a gaseous species can form or react with species in or generated in the liquid phase to produce either a gaseous or solution product.

Figure 8:
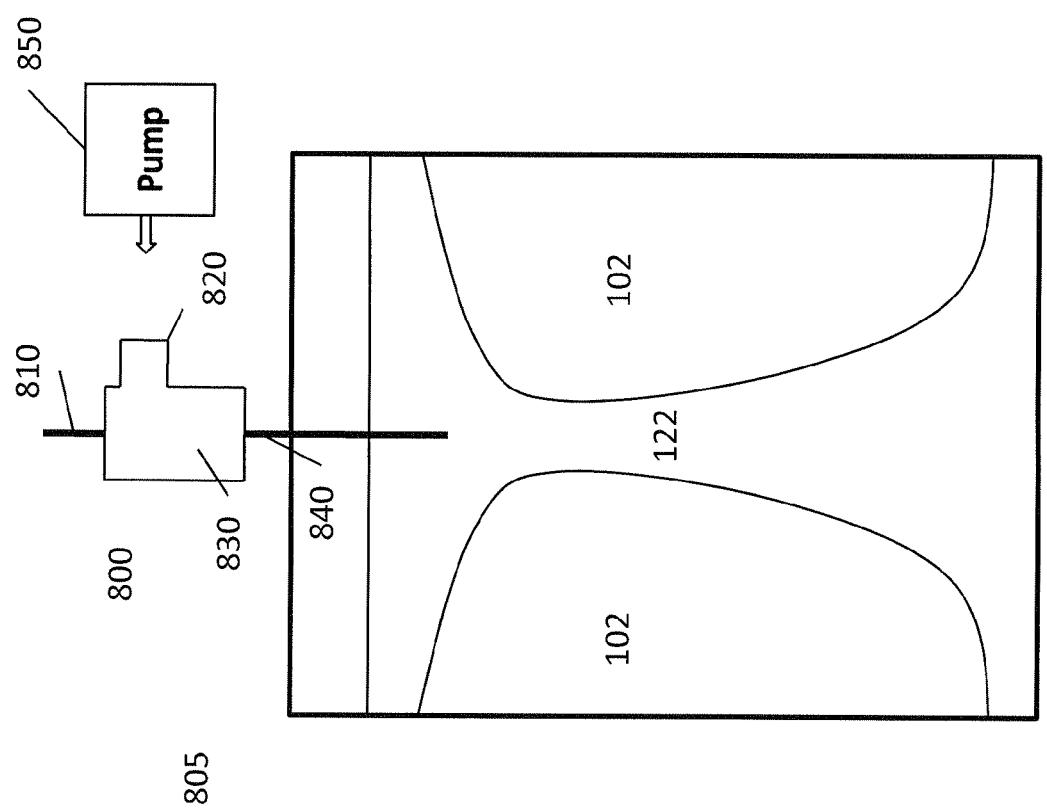
FIG. 8 shows a plasma gliding arc discharge reactor with an example of a new nozzle.
Figure 9:
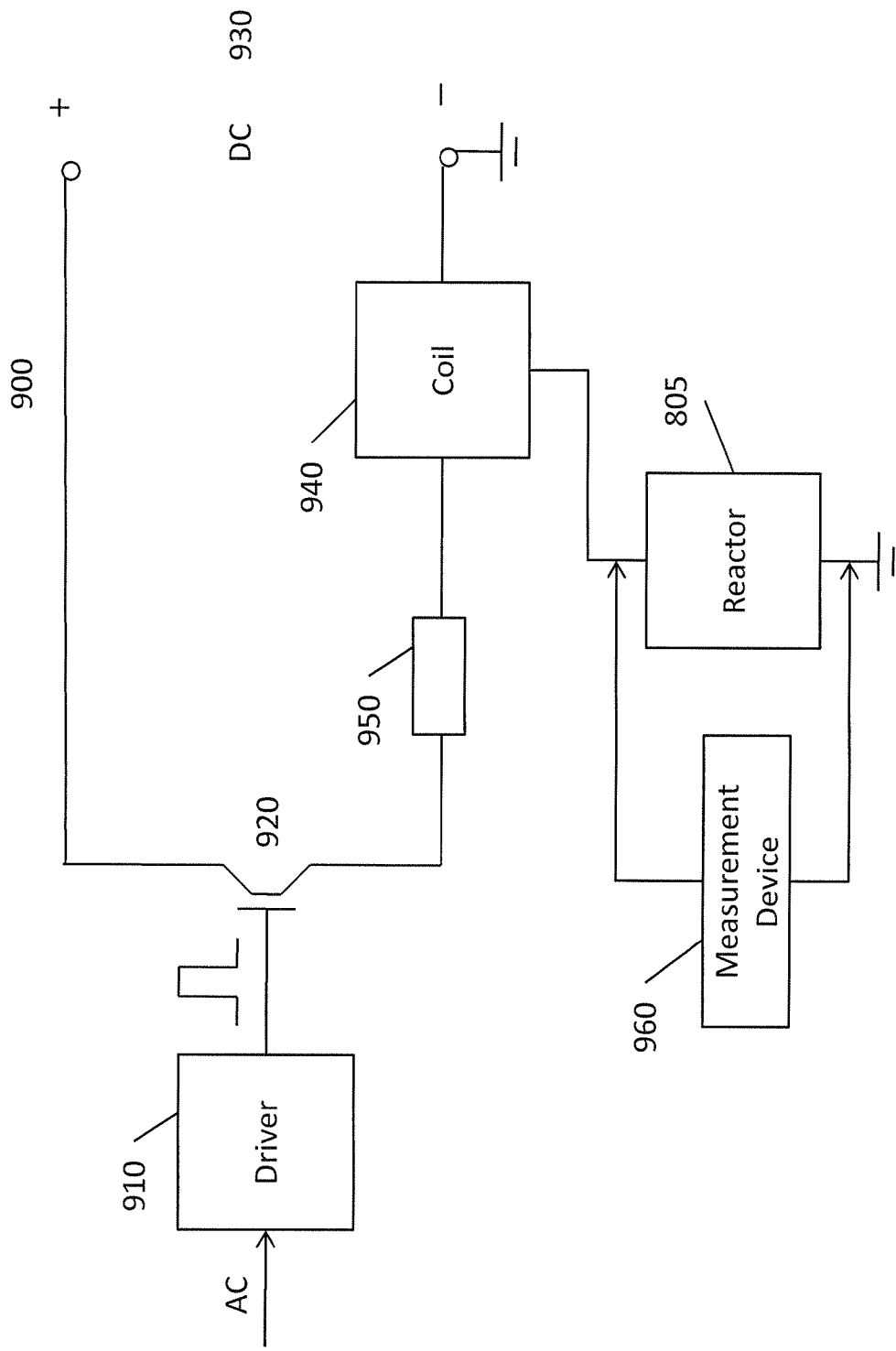
FIG. 9 shows an example of a pulsed power supply that can be used with a plasma gliding arc discharge reactor.

In one arrangement, the pulsed plasma gliding arc reactor of FIG. 1 can be outfitted with a new nozzle configuration, which may aid in the efficiency and cost-effectiveness of the reactor. An example of such a nozzle and reactor is shown in FIG. 8. In this arrangement, a nozzle 800 can be coupled to a housing of a gliding arc reactor 805 and may include a first inlet 810 for receiving a carrier gas and a second inlet 820 for receiving a liquid. The nozzle 800 may also include a mixing chamber 830 that is coupled to both the first inlet 810 and the second inlet 820. In addition, the nozzle 800 may include an outlet 840 that can also be coupled to the mixing chamber 830.

As an option, the reactor 805 that employs the nozzle 800 may have a confined configuration. For example, the size of the reactor 805 may be reduced to increase the efficiency of the reactor 805. In one arrangement, the volume of the reactor 805 may be limited to no more than three milliliters (mL), although other suitable volumes may be utilized. Limiting the size of the reactor 805 can ensure that proper interaction of the gases in the region 122 (see FIG. 1) takes place. A "confined configuration" means an overall shape or form with defined dimensions that result in all or most of the gases that enter a reactor passing through a plasma region of the reactor.

Although the nozzle 800 as pictured here has two discrete inlets entering the mixing chamber 830, it is understood that such an example is not intended to be limiting. For example, the first inlet 810 and the second inlet 820 of the nozzle 800 may be integrated into a single inlet upstream of the mixing chamber 830, if so desired. That is, the nozzle 800 may have a first inlet 810 and a second inlet 820 that have been integrated into a single inlet prior to their connection with the mixing chamber 830 such that the mixing chamber 830 has a single inlet for receipt of the liquid and the carrier gas. As used herein, the term "nozzle" is defined as any structure capable of directing or regulating the flow of a fluid. In addition, the term "mixing chamber" is defined as any structure capable of receiving two or more substances and combining, uniting or joining the substances.

The nozzle 800 may direct a mixture of a carrier gas and a liquid to a region 122 (see also FIG. 1) between the divergent electrodes 102 (see also FIG. 1), thereby generating a plasma in the region 122. This region 122 may also be referred to as a plasma region. The plasma region 122 may be non-thermal or thermal throughout the entire region 122 or the plasma region 122 may have both thermal and non-thermal characteristics throughout the region 122. The carrier gas can be injected into the mixing chamber 830 via the first inlet 810, and the liquid can be injected into the mixing chamber 830 from the second inlet 820, which results in the two fluids mixing together in the mixing chamber 830. The velocity of the carrier gas can cause the liquid to disintegrate into small aerosol particles or droplets in the mixing chamber 830, which may produce an aerosolized spray that is a mixture of carrier gas and droplets of the liquid. The outlet 840 may then direct the aerosolized spray into the plasma region 122 of the reactor. That is, the aerosolized spray of the carrier gas and the liquid may be created prior to the mixture entering the plasma region 122. As used herein, the term "aerosolized spray" means a suspension of liquid droplets and—possibly—fine solid particles in a gas. "The word "inject" or "injecting" means to introduce, force or drive a substance into a location or another substance, and any driving force is not necessarily limited to a mechanical means.

This process of generating the aerosolized spray prior to entering the plasma region 122 can lead to increased contact between the liquid and the plasma in the region 122. Results of this enhanced contact have shown an increase in the amount or concentration of certain types of reaction products that are generated in the reactor, such as hydrogen peroxide, hydrogen and nitrates. Moreover, such an increase has been demonstrated with various carrier gases, including air. A "reaction product" is defined as any substance or composition that is generated as a result of chemical processes that take place in the reactor.

In one arrangement, the liquid may be water. The term "water" as used herein refers to pure water or water that contains one or more solutes or even insoluble materials, whether such substances are intentionally or unintentionally added to the water. In one particular example, and as will be described below, the liquid may be a combination of water and methanol or some other organic liquid. An organic liquid is defined as a liquid that is made up of molecules containing carbon and may or may not constitute a pure form of a given compound. As such, the methanol liquid referred to here may or may not be pure methanol.

Many types of gases may be used as a carrier gas. For example, air, argon, oxygen and nitrogen are all suitable examples of a carrier gas. In addition, any suitable combination of gases may be used as a carrier gas. The term "carrier gas" is defined as any gas or combination of gases that can be mixed with a liquid in a mixing chamber for producing one or more reaction products in a plasma gliding arc discharge reactor. When using any carrier gas, pure or non-pure forms of such gas may be employed, including when carrier gases are used in combination with one another.

As noted earlier, the velocity of the carrier gas leads to disintegration of the liquid in the mixing chamber 830. To "disintegrate" or "disintegration" means to reduce or separate into droplets or fine particles. For example, the carrier gas may have a flow rate of eight liters per minute (L/m). It is understood, however, that the flow rate of the carrier gas may be adjusted to any suitable rate and that there are a plurality of flow rates from which to choose. The liquid also has a flow rate, and as an option, this flow rate may be selected from a plurality of flow rates. An exemplary range from which to choose a liquid flow rate includes about 2 milliliters per minute (mL/min) up to about eight mL/min or even higher, depending on when the plasma would be quenched by too high of a flow rate.

One skilled in the art will appreciate that the flow rates of both the carrier gas and the liquid may be adjusted to accommodate any changes in the reactor 805 or to produce different results from its operation. It is also understood that the liquid can be recirculated through the reactor any suitable number of times, including a single time. That is, the liquid may be fed through the reactor 805 and may pass through the reactor 805 one or more times before being drained and—if desired—additional liquid is added. Passing the liquid through the reactor 805 multiple times may increase the amount and/or concentration of reaction products that are generated in the reactor 805.

The flow of the liquid to the nozzle 800 may be a substantially continuous and consistent stream or may be varied. For example, referring again to FIG. 8, a pulsed pump 850 may be used to force the liquid into the mixing chamber 830 in which the liquid is injected into the mixing chamber 830 through a recurrence of discrete strokes (i.e., a pulsed manner). This recurrence of strokes may be rhythmic or may even be random or pseudo-random in nature. In one particular example although without limitation, the pulsed pump 850 may be a peristaltic pump or any other positive displacement pump.

A reactor that uses the nozzle 800 may be powered by a pulsed power supply that is similar to that described in previous examples. Alternatively, a non-pulsed power supply may be used in this configuration. Referring to FIG. 9, an example of a pulsed power supply 900 that may be used in this example is illustrated. Here, a driver 910, such as a fly-back driver, may receive AC power and convert the AC power into pulses for driving a switch 920. As an example, the switch 920 may be an insulated-gate bipolar transistor (IGBT). The switch 920 may be coupled to a DC power supply 930 and an ignition or induction coil 940 (through a resistor 950). The output of the coil 940 may be coupled to the divergent electrodes 102 of the reactor 805 (see also FIG. 8). As an option, a measurement device 960 may be coupled to the input and output of the reactor 805 to record current and voltage waveforms or values. In one specific example but without limitation, the DC power supply 930 may provide 20 volts DC, and the driver 910 may provide pulses with a duration of 2.5 milliseconds (ms) to the switch 920 at a frequency of 250 Hz.

Use of a pulsed power supply can result in lower average discharge power. In fact, average discharge power values of between 200-300 milliwatts (mW) may be sufficient for production of the desired reaction products in the reactor. Higher values for average power discharge, such as five to seven watts or even more, may be used to increase the amount of such products being generated when compared to that produced at the lower power levels, although not as efficiently as can be done with the lower power values.

Figure 10:
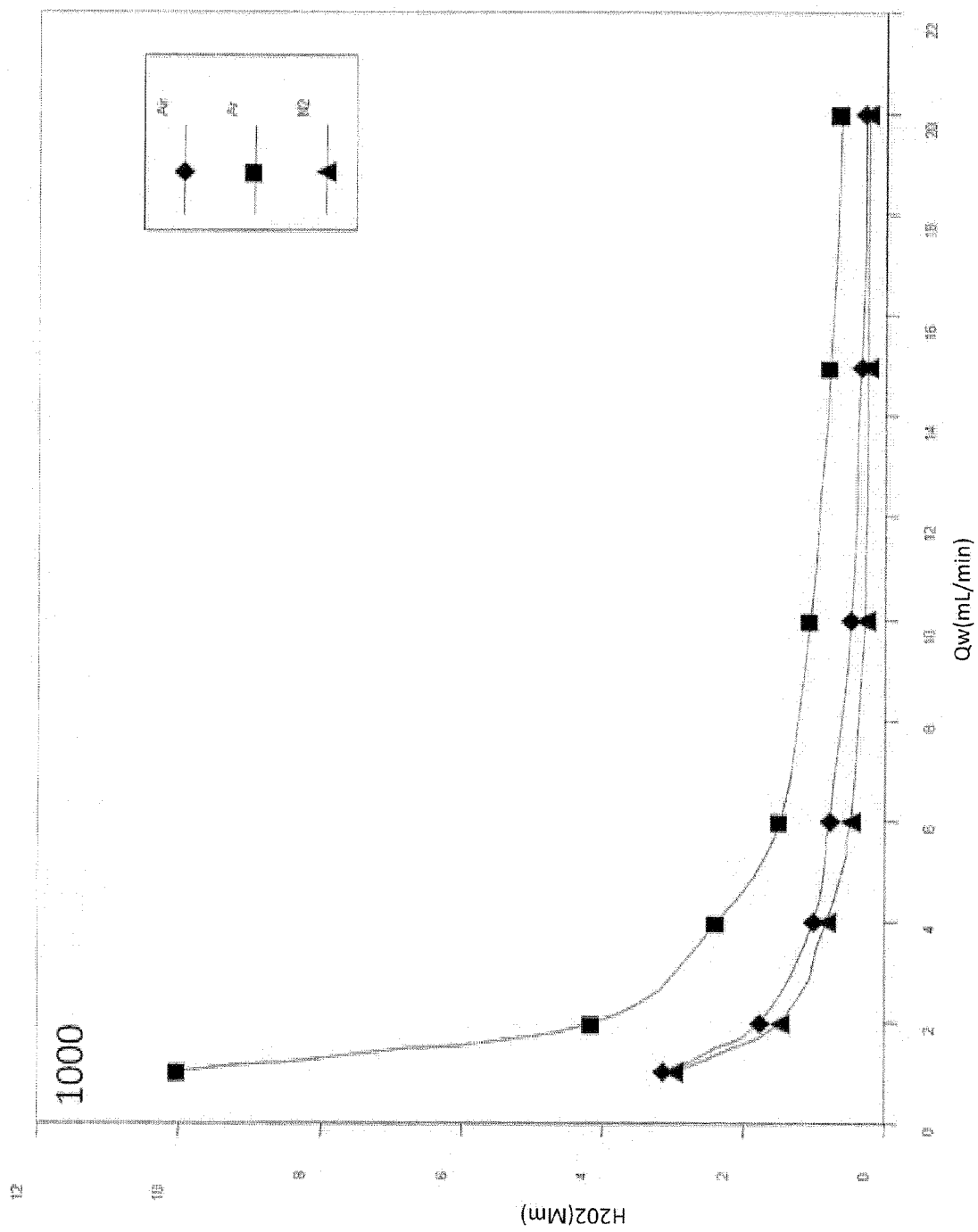
FIG. 10 shows a graph that maps an example of the concentration of hydrogen peroxide against flow rate of a liquid for various carrier gases.

As noted earlier, the configuration described above can lead to an improvement in efficiency and cost-effectiveness of a reactor. For example, referring to FIG. 10, a graph 1000 showing various $H_2O_2$ concentrations for different water flow rates and carrier gases is shown in which a pulsed power supply was used for providing power to the reactor. In this example, argon, nitrogen and air were used as carrier gases and water was used as the liquid. The flow rate for the water ranged from 1 mL/min up to 20 mL/min, which was fed in a continuous stream, and the power of the discharge, as measured at the electrodes, was about 300 mW. The $H_2O_2$ concentrations were measured in millimolars (mM).

Consistent with previous examples, the use of argon as a carrier gas produced the highest $H_2O_2$ concentrations. In contrast, however, the above-described configuration generated significant amounts of $H_2O_2$ when nitrogen or air was used as a carrier gas. It is believed that the increase in $H_2O_2$ concentrations for these carrier gases, particularly in the case of air and nitrogen, was due to the use of the aerosolized spray generated by the nozzle 800. This result shows that the use of readily-accessible, low cost carrier gases such as air and nitrogen can be used to generate substantial amounts of $H_2O_2$. As used herein, the word "air" is defined as the mixture of gases that make up the earth's atmosphere and includes both natural and man-made elements, whether such elements are introduced intentionally or unintentionally.

Figure 11:
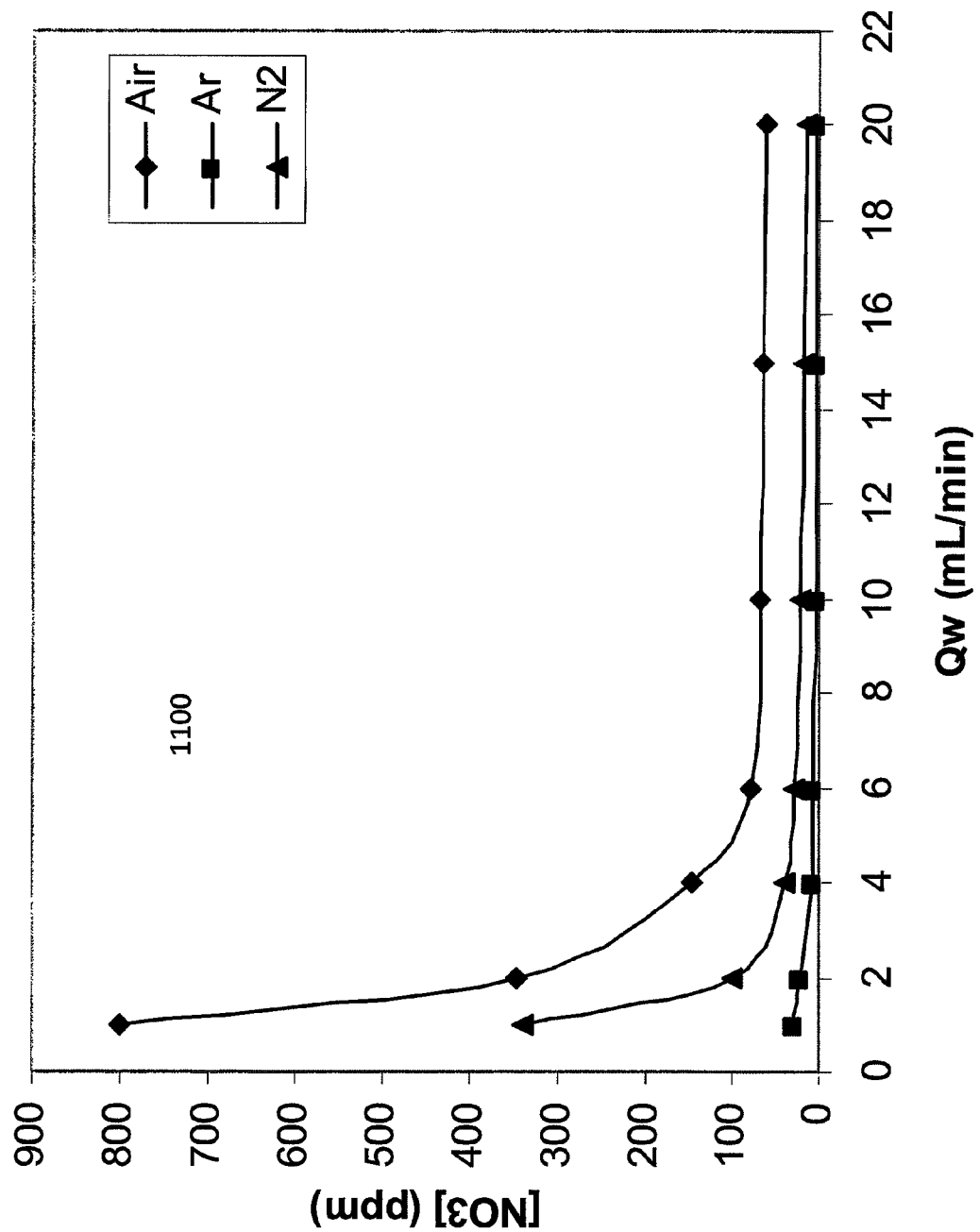
FIG. 11 shows a graph that maps an example of the concentration of nitrates against flow rate of a liquid for various carrier gases.

The new configuration described above may also generate substantial amounts of reactive nitrogen species. For example, referring to FIG. 11, another graph 1100 is shown in which operating parameters similar to those described with respect to graph 1000 of FIG. 10 were used (water was the liquid and air, nitrogen and argon were the carrier gases). In this case, however, the concentration of nitrates was measured (in parts per million (ppm)). As can be seen, significant concentrations of nitrates ($NO_3^-$) were generated, particularly when air was used as the carrier gas. Both graphs 1000 and 1100 demonstrate that both $H_2O_2$ and $NO_3^-$, which are important in disinfection processes, can be produced in a reactor when employing an aerosolized spray when air or nitrogen are used as carrier gases.

In the case of air (or nitrogen), the high concentrations of $NO_3^-$ as reflected in graph 1100 result from the reaction of $NO_2$ with $H_2O_2$, as much of the $NO_3^-$ is formed from the decomposition of the $H_2O_2$. Nevertheless, the above-described process produces $H_2O_2$ in such excess that it overcomes the loss of the $H_2O_2$ during the formation of the $NO_3^-$.

Figure 12:
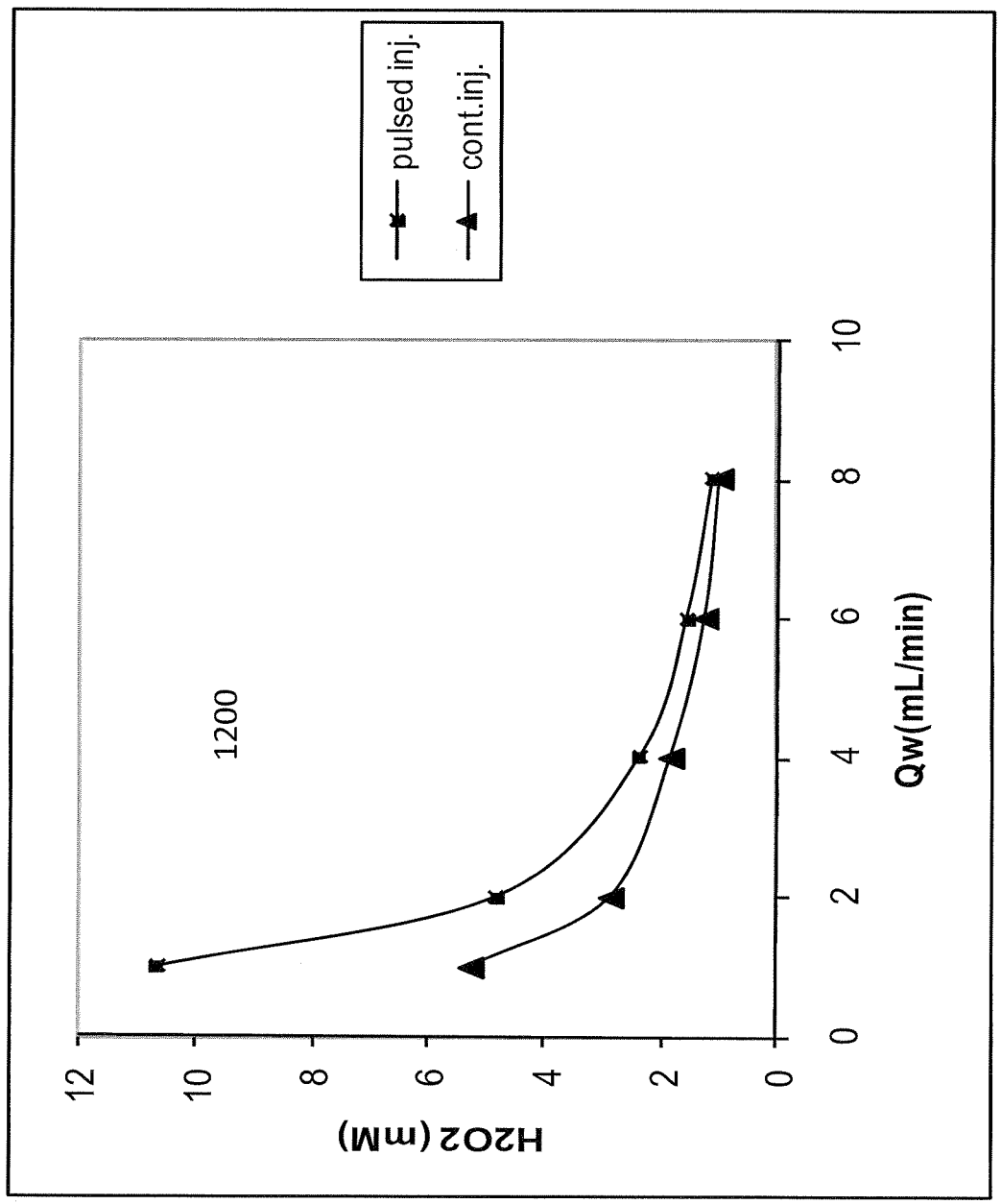
FIG. 12 shows a graph that maps an example of the concentration of hydrogen peroxide against flow rate of a liquid for a carrier gas using different types of injection for the liquid.

In the example just described, the flow of the water was substantially a continuous stream. As noted earlier, the flow of the liquid can be in a pulsed manner. Referring to FIG. 12, a graph 1200 demonstrates the effect of using a flow of liquid, such as water, in a pulsed manner as compared to a continuous flow. The curve representing a pulsed injection projects arrowheads onto its data points, while the continuous stream curve plots triangles onto its data points. In this example, argon is used as the carrier gas, and the concentration of $H_2O_2$ is measured against various flow rates for the liquid. All other parameters, such as average power discharge and carrier gas flow rates, were held substantially equivalent in comparison to graphs 1000 and 1100. As can be seen, the use of a pulsed stream generates a higher level of $H_2O_2$ concentration when compared to a continuous stream. Moreover, if the liquid is recirculated multiple times through the reactor, the level of reaction products that are generated in the reactor may increase, and this principle applies to graphs 1000, 1100 and 1200.

Figure 13:
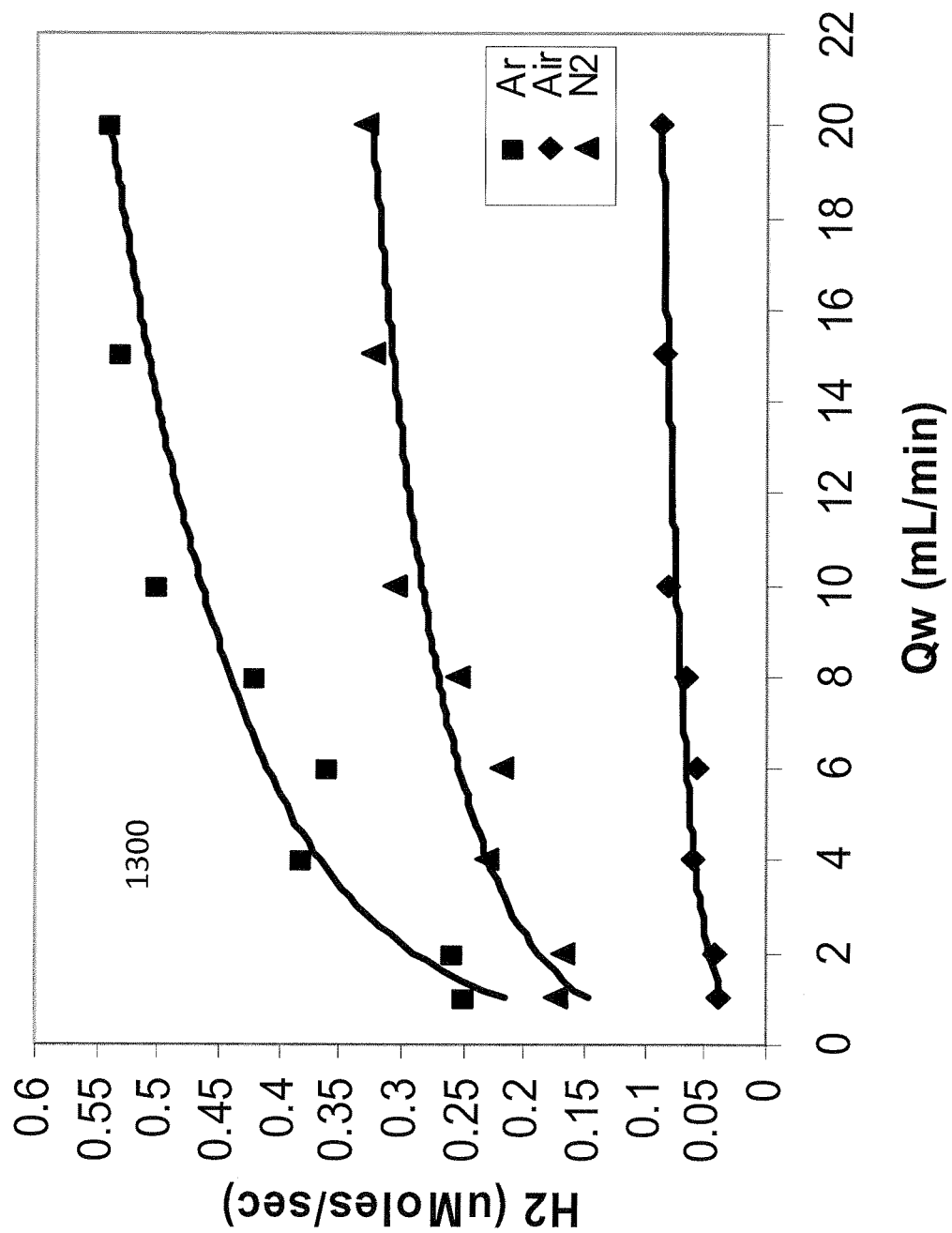
FIG. 13 shows a graph that maps an example of the production rate of hydrogen against flow rate of a liquid for various carrier gases.

The operation of a reactor containing the nozzle 800 described above may also lead to the production of hydrogen. Referring to FIG. 13, a graph 1300 that shows the production of hydrogen in micromoles per second (µM/sec) mapped against flow rate of a liquid in mL/min. Here, the operating conditions are similar to those described in relation to graphs 1000 and 1100 of FIGS. 10 and 11. That is, a carrier gas of argon, air or nitrogen can be used with a flow rate of eight L/min, and water can be the liquid, with continuous stream flow rates for the water selected from 1 mL/min to 20 mL/min. The discharge power measured at the electrodes was roughly 300 mW. As reflected in the graph 1300, the production rate of hydrogen was significant, particularly when argon was the carrier gas. As also shown in the graph 1300, the production rate of hydrogen actually increased for a higher flow rate of the liquid.

Figure 14:
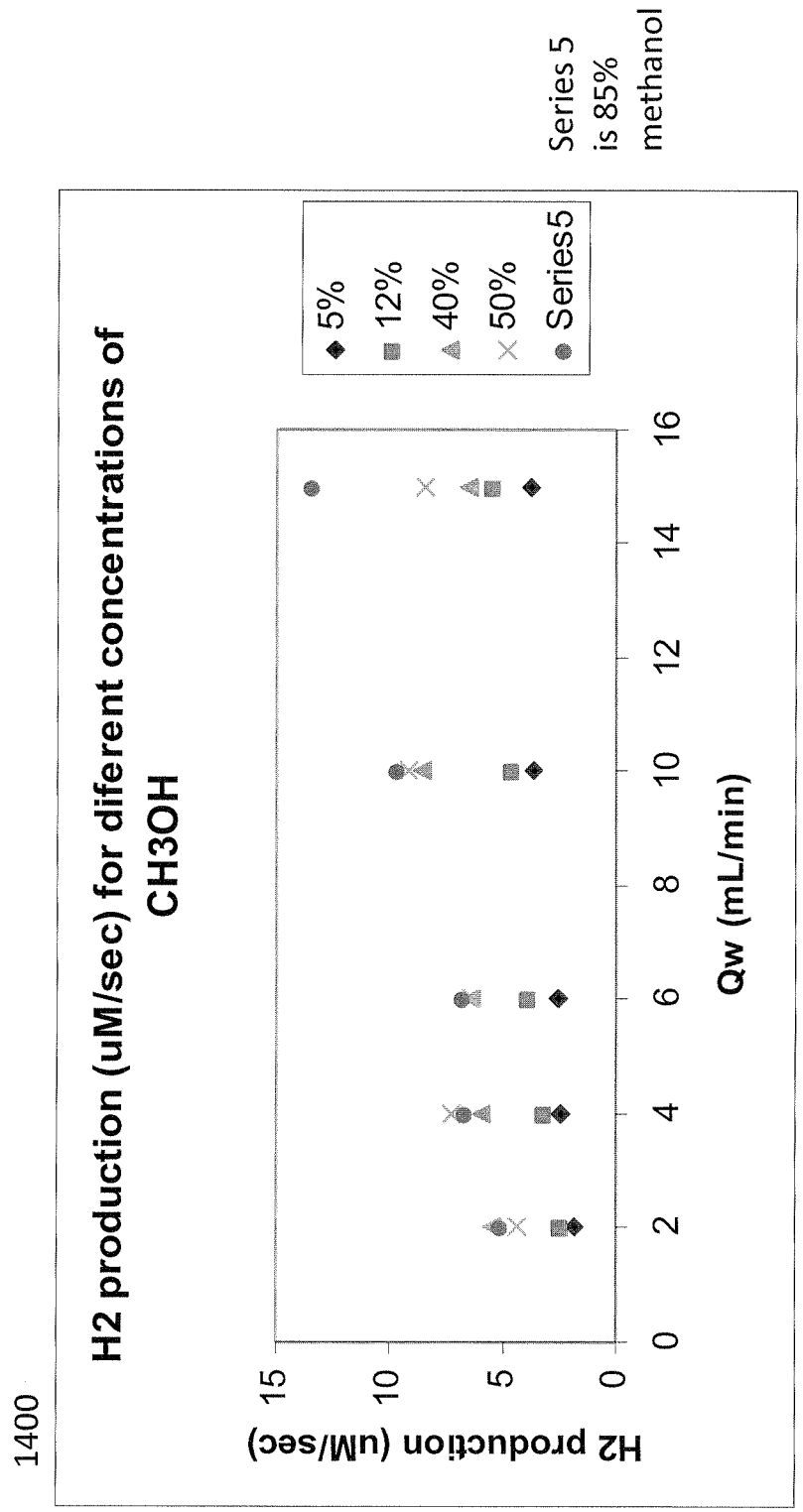
FIG. 14 shows a graph that maps an example of the production rate of hydrogen against flow rate of a liquid that contains methanol.

In one arrangement, one or more other liquids may be used to bolster the production of hydrogen in the reactor. For example, a combination of water and methanol may be used to increase the amount of hydrogen generated. Referring to FIG. 14, a graph 1400 is shown in which the production rate of hydrogen (in µM/sec) is mapped against the flow rate of the liquid (in mL/min). Here, the carrier gas is argon, flowing at a rate of about eight L/min, and the flow of the combination of water and methanol had a flow rate measured from about 2 mL/min up to roughly 15 mL/min. Average power discharge for the reactor, as measured at the electrodes, was approximately 300 mW.

Each of the symbols on the graph 1400 corresponds to a water/methanol combination that has a certain percentage of methanol contained in the combination. The table on the right indicates that the concentration of methanol ranged from about five percent up to about eighty-five percent (Series 5 is comprised of eighty-five percent methanol). When compared to the graph 1300 of FIG. 13, it can be seen that adding methanol to the water improved the production rate of hydrogen in the reactor 805, particularly for higher concentrations of methanol. Similar to graph 1300, the data points in graph 1400 indicate that the production rate also increased for higher flow rates of the liquid for all concentrations. Using these various concentrations of methanol may also increase the production rate of hydrogen if air or nitrogen, or any other suitable gas, is used as the carrier gas.

In summary, disintegrating the liquid, which leads to an aerosolized spray containing the carrier gas droplets of the liquid, can lead to efficient and cost-effective production of certain reaction products, like $H_2O_2$, $NO_3^-$ and $H_2$. This principle is particularly true when air or nitrogen is used as a carrier gas. Moreover, certain other parameters may affect production rates or concentrations of the reaction products. These parameters include—but are not limited to—the flow rates of the carrier gas and the liquid, the type of carrier gases and liquids that are used, the average power discharge, the use of a pulsed power supply and the use of a pulsed pump.

It is to be understood that while the invention has been described in conjunction with the specific embodiments thereof, that the foregoing description as well as the examples, which followed are intended to illustrate and not limit the scope of the invention. Other aspects, advantages and modifications within the scope of the invention will be apparent to those skilled in the art to which the invention pertains.

We claim:

1. A plasma gliding arc discharge reactor, comprising:

a housing having a plurality of divergent electrodes supported by the housing;

a pulsed power supply configured for generating a plurality of input pulses;

an ignition coil coupling the plurality of divergent electrodes to the pulsed power supply, the ignition coil configured for delivering at the plurality of divergent electrodes a plurality of output pulses generated from the plurality of input pulses;

a nozzle that is coupled to the housing and that directs a mixture of a carrier gas and a liquid to a region between the divergent electrodes, thereby generating plasma in the region;

wherein the nozzle comprises a first inlet for receiving the carrier gas, a second inlet for receiving the liquid, a mixing chamber that is coupled to both the first inlet and the second inlet and that is configured to mix the carrier gas and the liquid prior to being directed to the region, and an outlet that is coupled to the mixing chamber and that directs the mixture of the carrier gas and the liquid to the plasma region; and wherein the plurality of input pulses and the plurality of output pulses each comprise a plurality of single polarity voltage pulses.

2. The reactor of claim 1, wherein after exiting the mixing chamber, the mixture of the carrier gas and the liquid is an aerosolized spray in which the liquid is comprised of droplets.

3. The reactor of claim 1, wherein the liquid is water or a combination of water and methanol.

4. The reactor of claim 1, wherein a flow rate of the liquid is from about 1 mL/min to about 20 mL/min.

5. The reactor of claim 1, wherein the carrier gas is one of air, argon, oxygen or nitrogen or any combination of air, argon, oxygen or nitrogen.

6. The reactor of claim 1, wherein the flow rate of the carrier gas is is about 8 L/min.

7. The reactor of claim 1, further comprising a pulsed pump that injects the liquid into the mixing chamber through a recurrence of discrete strokes.

8. The reactor of claim 1, wherein the reactor has a confined configuration.

9. The reactor of claim 1, wherein reaction products are generated in the reactor and the reaction products include hydrogen peroxide, hydrogen or nitrates.

10. The reactor of claim 1, wherein the pulsed power supply and the ignition coil are configured to deliver the plurality of output DC pulses to the plurality of divergent electrodes, the plurality of output DC pulses being delivered at a frequency between about 160 Hz to about 250 Hz.

11. The reactor of claim 10, wherein the frequency is between about 166 Hz and 172 Hz, and wherein the pulsed power supply and the ignition coil are further configured to deliver the plurality of output DC pulses with a current pulse duration between about 0.2 ms and 0.4 ms, a peak current amplitude between about 0.38 amperes and 0.4 amperes, a voltage pulse duration between about 0.8 ms and 1 ms, and a peak voltage amplitude between about 650V and 700V.

* * * * *